(No Model.) 6 Sheets—Sheet 1.

W. W. HORNER.
MACHINE FOR AUTOMATICALLY SOAKING, BRUSHING, AND RINSING BOTTLES, &c.

No. 354,061. Patented Dec. 7, 1886.

Witnesses
Delbert H. Decker
Fred L. Eiwin

Inventor:
WILLIAM WHITFIELD HORNER
By his Attorney
Francis Forbes (No Model.) 6 Sheets—Sheet 2.
W. W. HORNER.
MACHINE FOR AUTOMATICALLY SOAKING, BRUSHING, AND RINSING BOTTLES, &c.
No. 354,061. Patented Dec. 7, 1886.
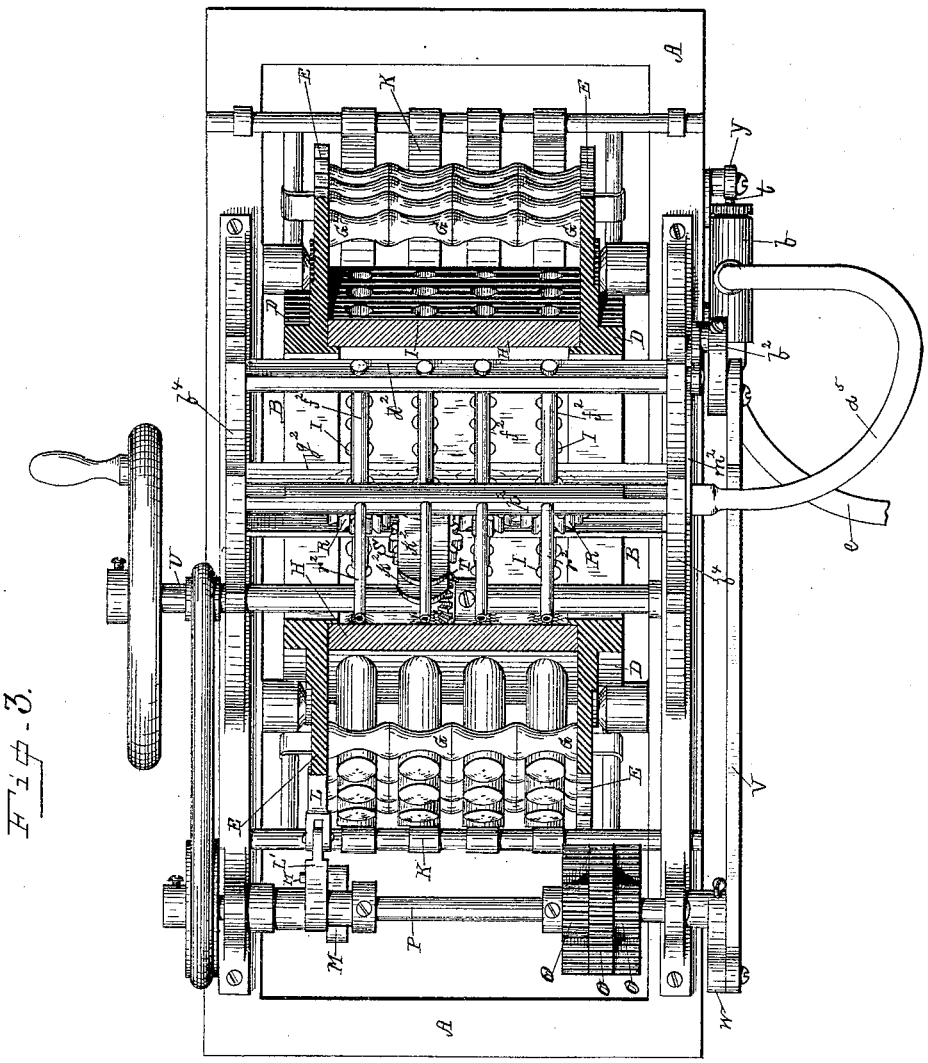

(No Model.)
W. W. HORNER.
MACHINE FOR AUTOMATICALLY SOAKING, BRUSHING, AND RINSING BOTTLES, &c.
No. 354,061. Patented Dec. 7, 1886.
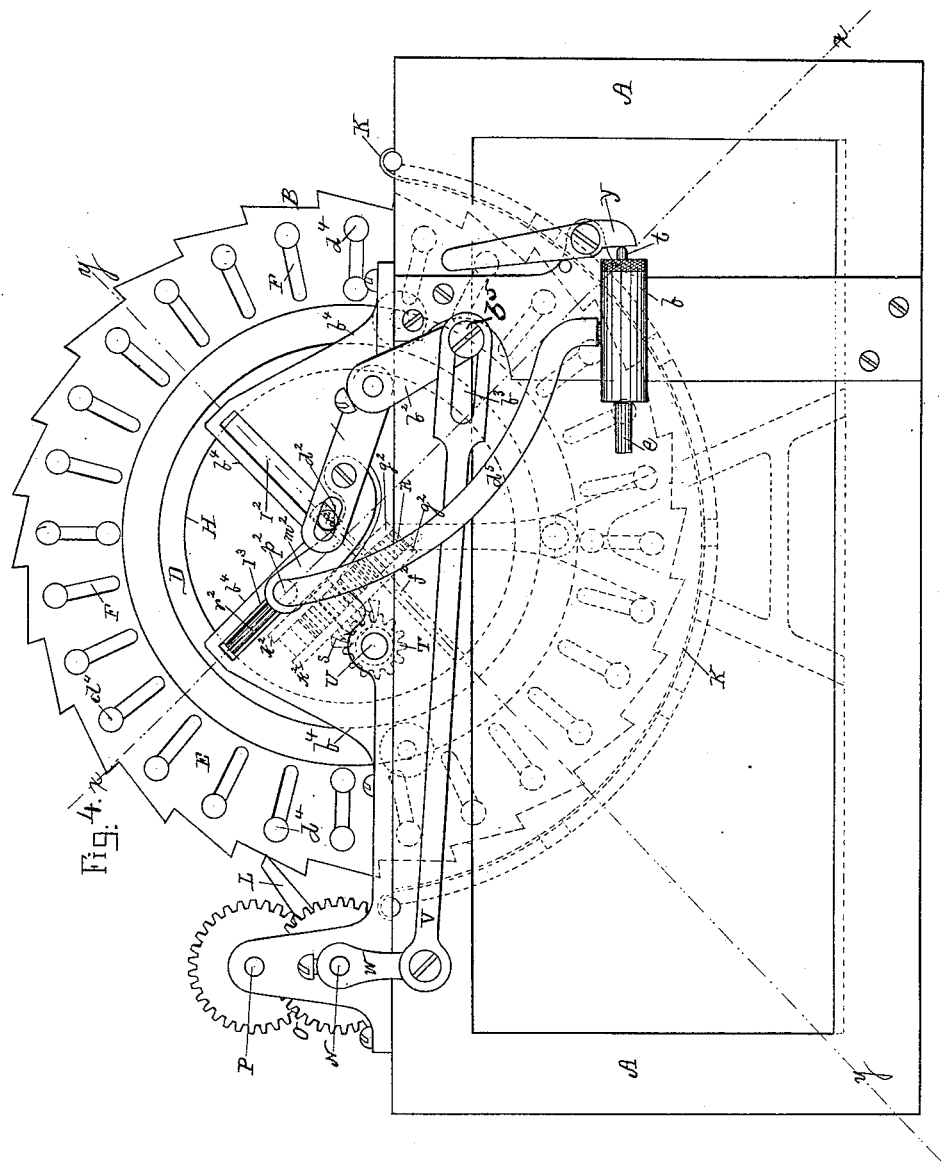
Witnesses.
M. A. Thompson
N. J. Simonds
Inventor.
Wm. W. Horner,
by Wm. A. Macleod
his atty

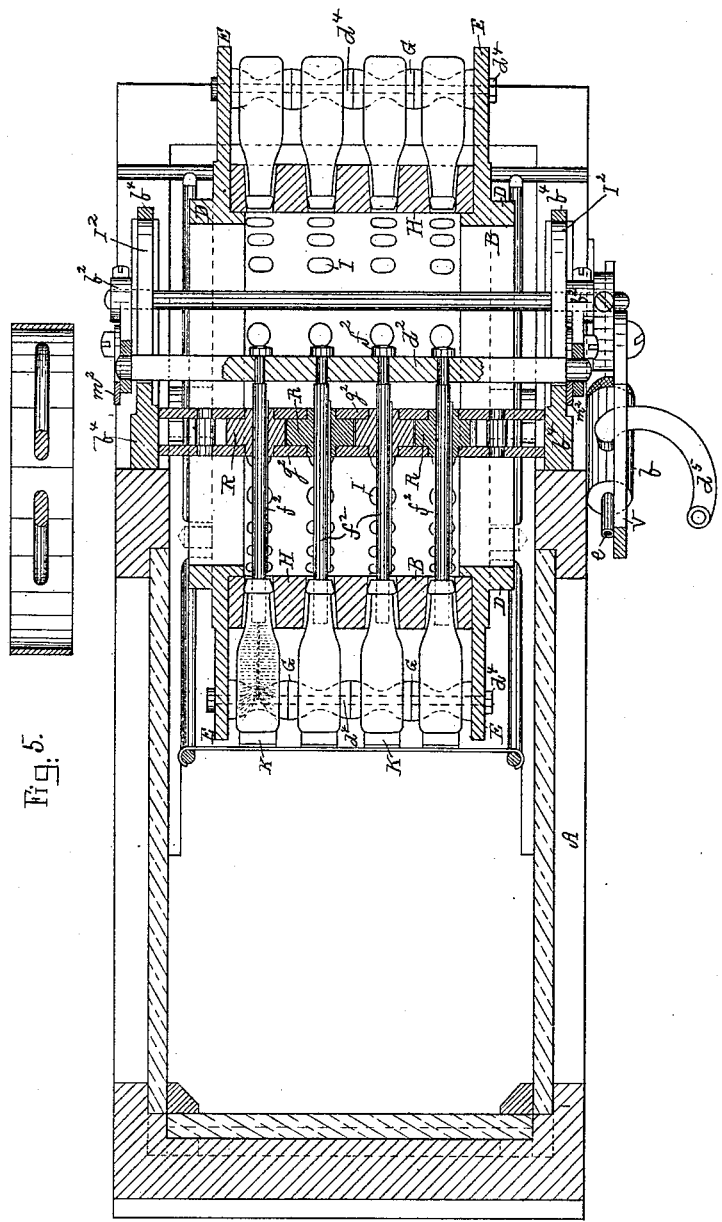

(No Model.) 6 Sheets—Sheet 5.

W. W. HORNER.
MACHINE FOR AUTOMATICALLY SOAKING, BRUSHING, AND RINSING BOTTLES, &c.

No. 354,061. Patented Dec. 7, 1886.

Witnesses.

Inventor (No Model.) 6 Sheets—Sheet 6.
W. W. HORNER.
MACHINE FOR AUTOMATICALLY SOAKING, BRUSHING, AND RINSING BOTTLES, &c.
No. 354,061. Patented Dec. 7, 1886.
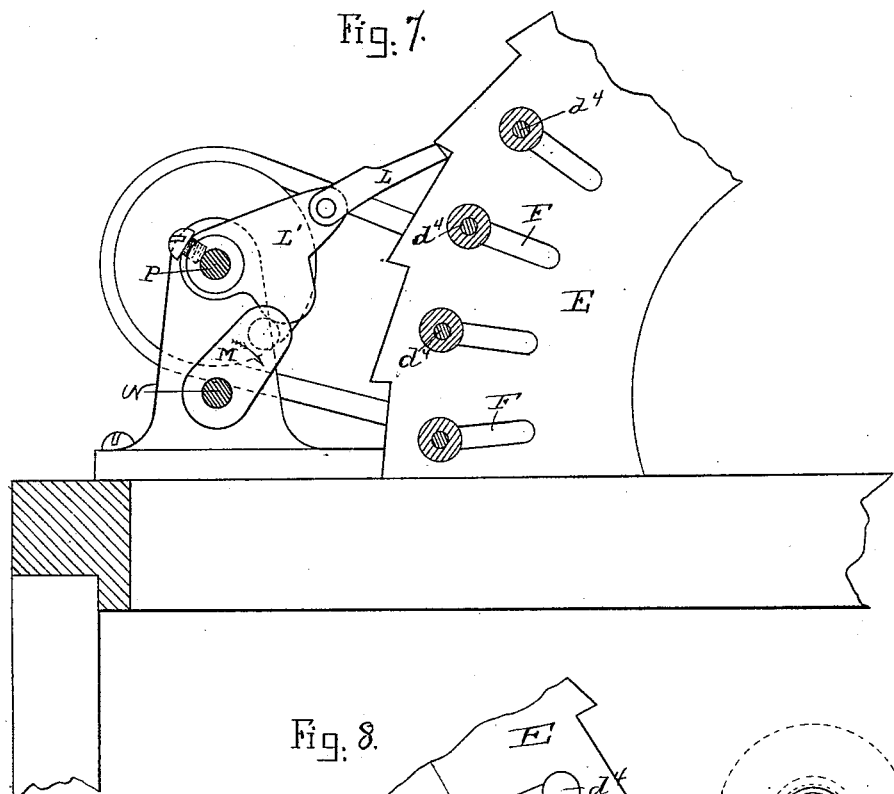
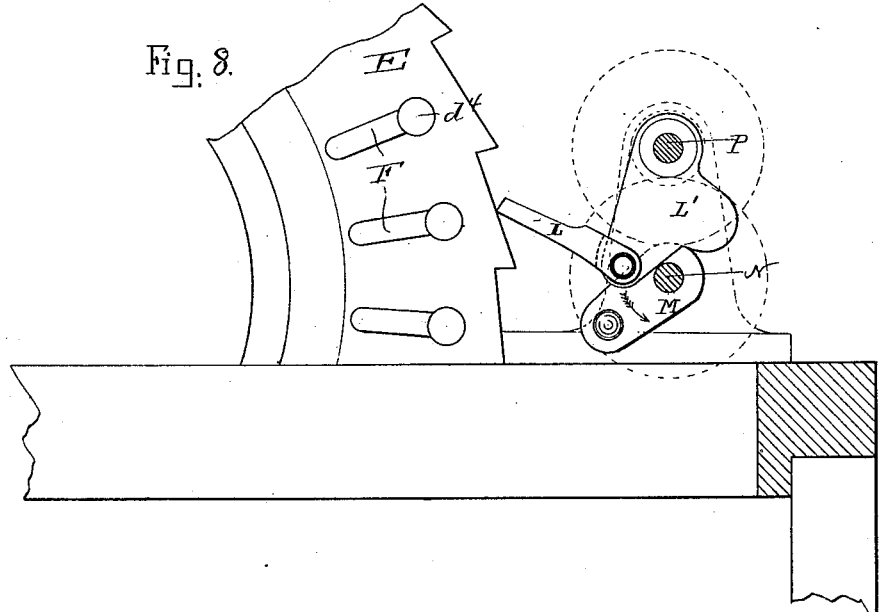
Witnesses.
Lauritz N. Möller
Robert Wallace
Inventor
William W. Horner
by Wm H. Macleod
his atty

UNITED STATES PATENT OFFICE.

WILLIAM WHITFIELD HORNER, OF LONDON, COUNTY OF MIDDLESEX, ENGLAND, ASSIGNOR OF ONE-HALF TO NATHAN J. SIMONDS, OF WOBURN, MASSACHUSETTS.

MACHINE FOR AUTOMATICALLY SOAKING, BRUSHING, AND RINSING BOTTLES, &c.

SPECIFICATION forming part of Letters Patent No. 354,061, dated December 7, 1886.

Application filed October 24, 1885. Serial No. 180,902. (No model.) Patented in England December 13, 1884, No. 16,426.

*To all whom it may concern:*

Be it known that I, WILLIAM WHITFIELD HORNER, a citizen of Great Britain, residing at London, in the county of Middlesex, England, have invented certain new and useful Improvements in Machinery for Automatically Soaking, Brushing, and Rinsing Bottles and Similar Receptacles, (patented in England by Letters Patent No. 16,426, dated December 13, 1884;) and I do hereby declare that the following is a full, clear, and exact description thereof, reference being had to the accompanying drawings, which form a part of this specification.

The object of my invention is the construction of a bottle-washing machine by which bottles and similar vessels may be soaked, brushed, and rinsed automatically, my invention comprising a tank provided with a drum or cylinder operated as hereinafter described, which receives the bottles, and by which they are carried through the tank containing water or other liquids in which they are soaked, and are then presented to the operation of the brushing and rinsing apparatus, the particular features of my invention being indicated by the claims at the end of this specification.

My present invention is an improvement on the machine shown and described in British Letters Patent therefor, No. 4,904 of 1882, granted to me.

I will describe my present invention as embodied in the machine shown in the accompanying drawings, using like letters of reference to indicate like parts.

Figure 2:
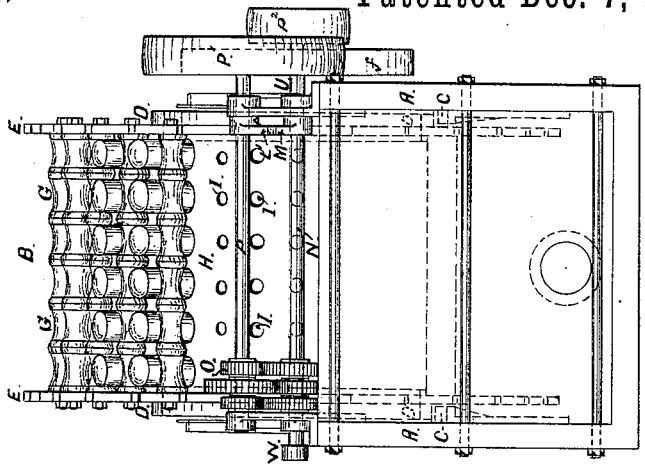
Figure 1:
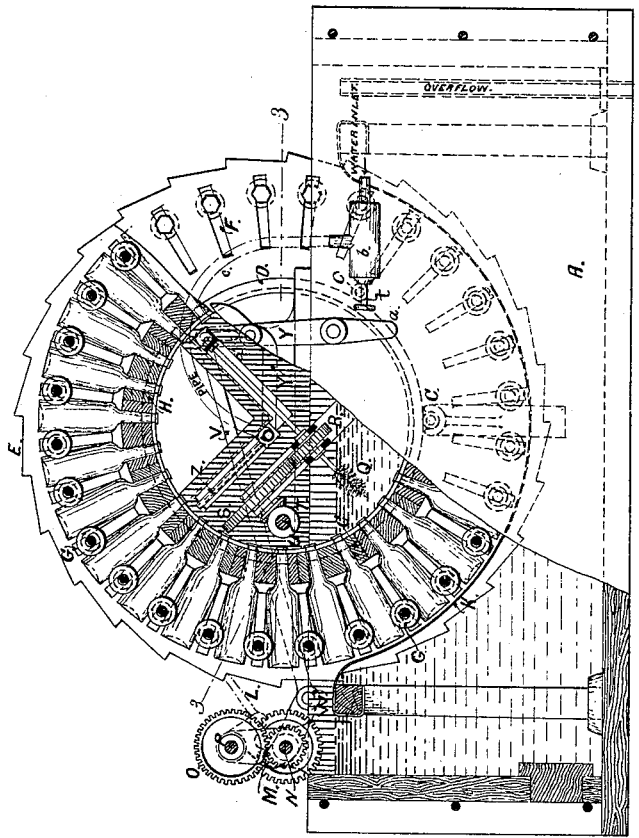
Figure 6:
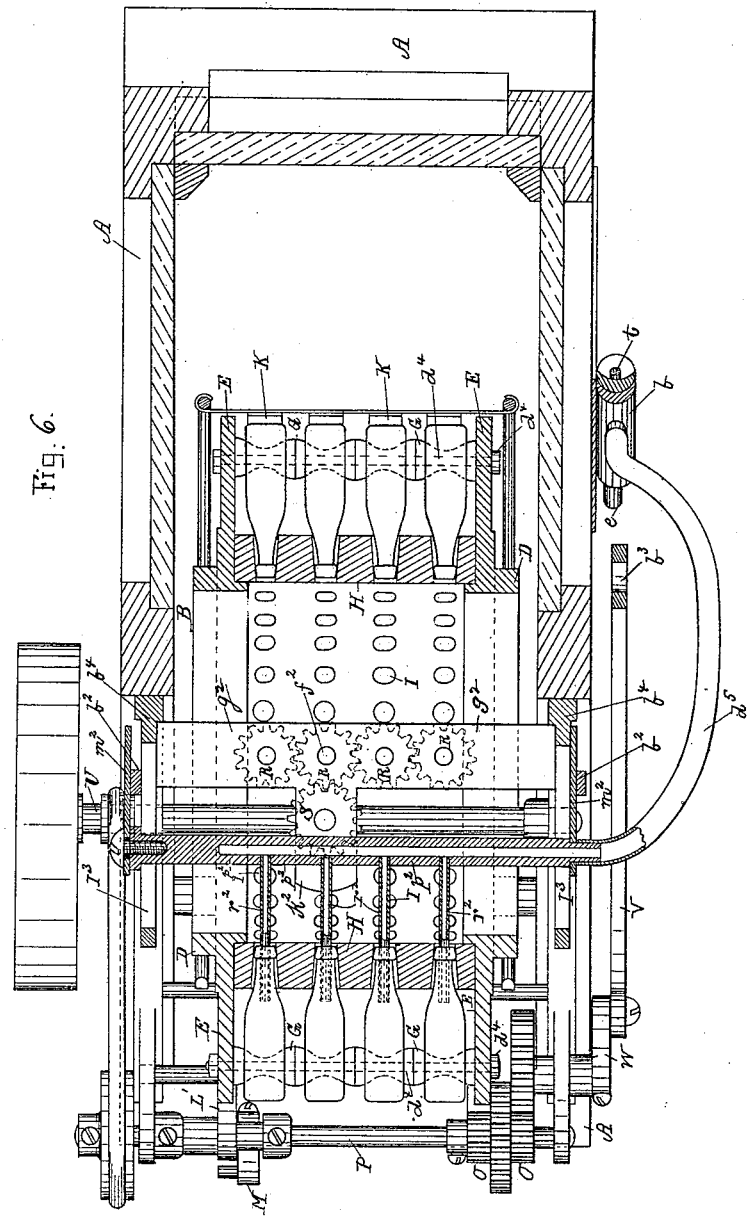

In the drawings, Figure 1 is a side elevation, partly broken away to show part of the apparatus in section. Fig. 2 is an end view. Fig. 3 is a plan view with part of the drum removed to show the mechanism for brushing and rinsing. Fig. 4 is a side elevation. Fig. 5 is a section on line $y\,y$, Fig. 4, showing the brushes. Fig. 6 is a plan view, partly in section, on line $x\,x$, Fig. 4, showing the rinsing apparatus. Figs. 7 and 8 are detail views showing part of the mechanism for operating the bottle-holding drum.

A is a tank, which may be of wood or other suitable material, and which is provided with an overflow for the purpose of freeing it from surplus water. Within this tank is mounted a drum or cylinder, B, so arranged as to be about one-half submerged when the tank is full of water. This drum is mounted by means of annular flanges D at either end, which bear on rolls C, set on studs secured inside the tank. This method of mounting on an annular axis is employed for the purpose of leaving the central space of the drum free for the insertion and operation of the apparatus for brushing and rinsing, hereinafter more fully described.

The drum B consists of an interior cylinder or body, H, to which the end pieces or heads, E, which carry the annular flanges D, are secured. This inner cylinder, H, is perforated, as shown at I, Figs. 2 and 3, to receive the necks of the bottles, and between the heads E, outside of the cylinder H, are stretched rods $d^4$, which pass through the heads E and are secured by nuts in radial slots in the heads. The rods are placed parallel with each other, and are provided with spools or cylinders G, mounted loosely thereon, and of the spool shape shown in Figs. 2 and 3, so that the spaces between the spools of one rod and those of the next are of the proper shape to receive the bodies of the bottles, and are so located relatively to the holes I of the cylinder H that when a bottle is placed between the spools G its neck will be in line to enter a hole I. The radial slots F in the heads E, which receive the spool-bars $d^4$, permit of the adjustment of the latter relatively to the cylinder H, so as to accommodate longer or shorter bottles. By this arrangement the drum B forms a cylindrical rack which holds each bottle apart from every other, and with their necks projecting inwardly toward the center.

To prevent any bottles which might become loose from falling into the tank as they are carried through by the revolution of the drum, a series of strips, K, of thin metal or other suitable material, are placed underneath the drum and suitably supported on rods secured to the tank, and are sufficiently near to the spools G to prevent the bottle from falling out of its place until the drum has revolved sufficiently to carry the bottle up above the top of the tank and above the horizontal position, when the action of gravity will tend to keep the bottle in place.

To permit of the brushing and rinsing operations, the bottles require to remain stationary for a given time in given positions, and to accomplish this the motion of the drum is intermittent and is obtained by means of a pawl, L, acting on the ratchet-teeth on the periphery of one of the heads E. The pawl L is pivoted to a bell-crank, L', which is loosely mounted on the shaft P. The shaft P is mounted in supports secured to the top of tank A, and is provided with a pulley at one end, by which it is belted to a pulley on the main shaft U, (see Fig. 3,) or the driving-pulley may be secured to shaft P, as shown in Fig. 2, in which case the shaft U is driven by a belt connecting therewith. Directly underneath the shaft P, and mounted in the same supports, is a shaft N, which is provided with a rigid arm, M, in line with the bell-crank L', and which, as the shaft revolves, strikes the bell-crank and gives the pawl L a forward motion, moving the drum forward the space of one ratchet-tooth. The return movements of the pawl and bell-crank are accomplished by gravity.

The shafts P and N are connected by reducing-gears O. (See Figs. 2 and 3.) The first pinion of said reducing-train of gears O is carried by shaft P. This pinion drives a spur-wheel, which is loose on shaft N. A second pinion carried by this spur-wheel drives a second spur-wheel, which is loose on shaft P, and carries a third pinion. This drives a third spur-wheel, which is fast on shaft N. On the end of the shaft N is secured a crank, W, to which is pivoted the pitman V, pivoted at its other end to a bent lever, $b^2$, by a slotted connection, Fig. 4, the pivot $b^5$ passing through a slot, $b^3$, cut lengthwise in the pitman. The object of this slot $b^3$ in the end of the pitman is to allow the brushing and rinsing apparatus to remain stationary while the drum is in motion. The lever $b^2$ is pivoted to a block on the top of the tank, and its upper end is slotted to receive the end of a rod, $d^2$, which extends through the drum, and in which the brush-shafts $f^2$ are swiveled. These brush-shafts are journaled in strips or pieces $g^2$ secured to the tank, and which extend through the drum parallel to the bar $d^2$. Between these strips $g^2$, and fast on each brush-shaft, is a small gear, R, the gear on one brush-shaft meshing with those on the adjacent shafts. These gears R are operated from the shaft U (see Fig. 3) by means of a beveled gear, T, set thereon, and an intermediate gear, S, journaled in projections $k^2$ secured to the strips or pieces $g^2$. The gears R are keyed on the brush-shaft, so as to permit of the sliding of the shafts through the gears, while at the same time they revolve with the gears. The bar $d^2$, in which the ends of the brush-shafts are swiveled, is pivoted to the bent lever $b^2$, which is operated by the pitman V, and the rod $d^2$ is given a reciprocating movement in guides $I^2$, cut in blocks $b^4$, secured to the top of the tank. The movement of this bar in the guides projects the brushes into the necks of the bottles, which are brought successively in line by the intermittent movement of the drum, and withdraws them therefrom.

The rinsing apparatus consists of a tube, $p^2$, which is supported on arms $m^2$, which are pivoted to the lever $b^2$, and the tube is guided at either end in slots $I^3$, cut in blocks $b^4$, secured on the top of the tank in the same manner as are the slots which guide the rod $d^2$, to which the brush-shafts are swiveled. The movement of the pitman V also actuates the tube through lever $b^2$ and the pivoted arms or links $m^2$, the tube moving toward the bottles at one part of the drum to throw a jet of rinsing-water into them as the rod $d^2$ moves toward those at another part, inserting the brushes into them, it being desirable to brush the bottles at one point and rinse them at another. On the tube $p^2$ the short tubes or pipes $r^2$, through which the jets of rinsing-water are thrown, are set, and so spaced as each to be opposite a bottle. The water to supply these tubes is admitted at one end of tube $p^2$ through a flexible pipe, $d^5$, which connects with a valve, $b$, secured to the tank, and into which water under pressure is admitted from another pipe, $e$, or in any convenient manner.

The object of the valve $b$ is to cut off the supply of rinsing-water from the pipes $r^2$, except when they are in the bottles—that is, while the drum B is moving—and this is effected automatically by means of a lever, Y, actuated by the pitman V, so as to bear at the proper times against the shank $t$, Figs. 1 and 4, of valve $b$, and open the valve.

In Fig. 1 the lever Y is located at one end of the valve $b$, while in the plan view, Figs. 3 and 4, it is shown as located at the opposite end; but this is obviously unimportant.

The operations of brushing one set of bottles and rinsing another are carried on simultaneously while the drum is at rest.

As will be obvious, the length of the drum B, and the consequent capacity of the machine, may be varied as desired.

The operation of the machine is as follows: The operator stands at the end of the tank, (shown at the right of Fig. 3,) and after removing a row of clean bottles inserts in their place dirty ones. These are slowly carried down into the tank and through the same as the drum revolves. Before they rise from the water on the other side of the drum, and after they have been soaked by their immersion, they are subjected to the operation of the rotary brushes. After being brushed they rise as the drum continues to revolve, until their mouths are downward, when the dirty water is emptied from them. The further revolution of the drum brings them in line with the rinsing-jets, by means of which clean water is thrown into them under pressure and they are rinsed. The further revolution of the drum, carrying them around to a point where the operator stands ready to remove them, allows them time to drip, and they are removed and the operation repeated.

What I claim is—

1. In a bottle-washing machine, the combination, with a tank and a bottle-holding drum provided with a ratchet-wheel, of a pawl adapted to engage said ratchet-wheel, a carrier for said pawl, a rotating shaft having an arm adapted to engage and operate said pawl-carrier, and a driving-shaft and intermediate mechanism for imparting motion to the said rotating shaft, whereby the said drum will be automatically and intermittingly rotated, substantially as set forth.

2. In a bottle-washing machine, the combination, with a tank, a bottle-holding drum, and a pawl-and-ratchet mechanism for intermittingly rotating the latter, of a rotating driving-shaft from which the said mechanism is operated, a set of rotary brushes radially movable within said drum, and mechanism, also operated by said driving-shaft, for rotating and reciprocating said brushes, substantially as set forth.

3. In a bottle-washing machine, the driving-shaft U, having the gear-wheel T, combined with the rotary brushes, their shafts and the gears R, for rotating the latter, and the intermediate gear, S, for rotating the gears R, substantially as set forth.

4. In a bottle-washing machine, the combination, with a tank, a bottle-holding drum, and a pawl-and-ratchet mechanism for intermittingly rotating the latter, of a rotating driving-shaft from which the said mechanism is operated, a set of rinsing pipes or jets radially movable within said drum, a pipe, $p^2$, by which the said rinsing pipes or jets are carried, a secondary shaft, as N, operated from the said driving-shaft, and connections through which the said secondary shaft reciprocates the said pipe $p^2$, to cause the said rinsing pipes or jets to enter the bottles at intervals, substantially as set forth.

5. In a bottle-washing machine, the combination, with the drum B, having the heads E, provided with inwardly-projecting flanges, of the inner cylinder, H, resting against said flanges and having holes adapted to receive the necks of the bottles, and suitable cross-pieces outside of the said cylinder H, adapted to hold the bodies of the bottles, substantially as set forth.

6. In a bottle-washing machine, the combination, with the drum B, having a head provided with ratchet-teeth, of the operating-pawl L, the bell-crank or supporting device to which the said pawl is pivoted, the shaft on which the said bell-crank swings loosely, and the rotating arm M, adapted to operate the said bell-crank, substantially as set forth.

7. In a bottle-washing machine, the combination, with the bottle-holding drum, the rinsing pipes or jets and their supply-pipes, of the valve $b$, having stem $t$, the lever Y, adapted to engage said stem, and the reciprocating pitman or rod V, for operating said lever, substantially as set forth.

8. In a bottle-washing machine, the combination, with a tank and a bottle-holding drum, of the stationary plates or strips $g^2$, the gears held between said strips, the brush-shafts adapted to reciprocate through said gears, but to be revolved thereby, and mechanism for rotating said gears, substantially as set forth.

9. In a bottle-washing machine, the combination, with the shafts U and P, of the reducing-gears O, the shaft N, its crank W, the pitman V, the levers $b^2$, the rod $d^2$, and the brush-shafts swiveled to the said rod and thus adapted to be reciprocated thereby, substantially as set forth.

10. In a bottle-washing machine, the combination, with the shaft N and its operating mechanism, of the crank W, the pitman V, the levers $b^2$, the arms or links $m^2$, pivotally attached to the said levers, and the pipe $p^2$, carried by the said arms or links and thus adapted to be reciprocated thereby, substantially as set forth.

In testimony that I claim the foregoing as my own I have affixed hereto my signature in presence of two witnesses.

WILLIAM WHITFIELD HORNER.

Witnesses:
  CHAS. F. RICHARDSON,
  W. F. TOULE.